United States Patent [19]

Cioffi

[11] Patent Number: 5,631,503
[45] Date of Patent: May 20, 1997

[54] APPARATUS FOR GENERATING POWER FOR USE IN A COMMUNICATIONS DEVICE

[75] Inventor: Kenneth R. Cioffi, Milpitas, Calif.

[73] Assignee: Wireless Access Inc., San Jose, Calif.

[21] Appl. No.: 307,933

[22] Filed: Sep. 16, 1994

[51] Int. Cl.[6] ............................................. H02J 7/04
[52] U.S. Cl. ..................... 307/66; 307/43; 307/45; 307/46; 307/64; 320/3; 320/11; 320/19; 320/39; 323/207
[58] Field of Search ........................... 307/43, 45, 46, 307/64, 66; 320/2, 3, 11, 19, 39; 363/10, 15; 323/207

[56] References Cited

U.S. PATENT DOCUMENTS

| | | | |
|---|---|---|---|
| 4,504,861 | 3/1985 | Dougherty | 358/143 |
| 4,939,770 | 7/1990 | Makino | 379/61 |
| 5,130,634 | 7/1992 | Kasai | 320/22 |
| 5,237,259 | 8/1993 | Sanpei | 320/23 |
| 5,391,974 | 2/1995 | Shiojima et al. | 320/35 |
| 5,455,637 | 10/1995 | Kallman et al. | 351/44 |

*Primary Examiner*—David S. Martin
*Assistant Examiner*—Albert W. Paladini
*Attorney, Agent, or Firm*—Blakely, Sokoloff, Taylor & Zafman

[57] ABSTRACT

A power generation technique to generate power for use in, for instance, a communication device having a transmitter and a receiver, where communication occurs over atmosphere, or airways (e.g., wireless). The present invention provides a battery-based system that generates power at a high current and high voltage while accommodating the required duty cycles using batteries with sizes that are not prohibitive given the size constraints associated with portable devices in general.

28 Claims, 2 Drawing Sheets

APPARATUS FOR GENERATING POWER FOR USE IN A COMMUNICATIONS DEVICE

FIELD OF THE INVENTION

The field of the invention relates to battery power generators; more particularly, the present invention relates to the field of battery-based power generation in communications devices such as wireless communications systems.

BACKGROUND OF THE INVENTION

A communication system transfers information between a source and a destination. Generally, a communication system includes a transmitter and a receiver which transmit and receive information signals over some media. This media may be cable wiring or atmosphere. When communications occur over atmosphere, or airwaves, they are commonly referred to as "wireless" communications. Examples of wireless communication systems include digital cellular, packet data, paging and digital cordless telephones, wireless modems, wireless local and wide area networks, digital satellite communications and personal communications networks.

Inherent in some wireless communications systems is equipment mobility. In other words, since the communication media is air, wireless communications equipment may be portable. If the equipment is portable, this communication equipment must provide its own source of power, such as a battery unit. Typical batteries used in portable devices may include AA batteries or AAA batteries producing 1.5 volts. In other portable devices, batteries such as Nickel Cadmium (NiCd) battery cells and lithium-ion battery cells may be used.

One problem with the AA or AAA batteries is that because of their internal series resistance and low voltage, they cannot satisfy the power requirements for certain portable devices. For example, a transmitter in a communications device may require a high voltage and high current power source to supply bursts of power to function, typically one that generates 3 to 5 watts of power. A 1.5 volt AA battery cannot generate this much power.

One solution for generating more power in a device is to increase the size or number of batteries used to power the portable device. However, space in portable devices is usually at a premium, and the battery size that may be used is often limited to the space available. A non-rechargeable battery of the size necessary to produce, for example, 3 to 5 watts, is much larger in size than the current batteries used in the portable devices. Therefore, it is desirable to generate the necessary power. In a device using as little space within the unit as possible.

Another solution for generating more power in a portable system is to use a capacitive discharge system wherein a capacitor is charged such that it discharges power at the desired wattage. There are problems with using a capacitive discharge system in portable devices. For instance, either the size of the capacitors which are required are prohibitive given the size constraints of the portable devices or existing capacitors have too much internal resistance. Even though the capacitors have enough capacity to power short transmitter bursts, they do not have enough capacity to power amplifiers in a transmitter for the time required to send a short message, particularly at low data rates typically used in portable wireless communications systems. Also, capacitive discharge systems cannot accommodate worst case duty cycles where a transmitter or other device is repeatedly placed on and off for short periods of time. That is, a single capacitor could not provide bursts of power for a short period of time and then recharge fast enough for currently desired duty cycles. Therefore, using a capacitor discharge scheme limits the size of data packets that could be sent and the time between data packets has to be lengthened to accommodate intervening recharge cycles.

The present invention provides a technique to generate high-current pulses in a small area. This allows the size of a transmitter to be miniaturized specifically for certain applications.

SUMMARY OF THE INVENTION

An apparatus for generating power for use in an electronic device is described. The apparatus comprises a first battery (power source), a second battery and a charging mechanism. The first battery (power source) supplies power at a first voltage and a first current, while the second battery supplies power at a second voltage and second current. The power from the second battery is greater than the power from the first battery. In one embodiment, the charging mechanism charges the second battery using a third voltage derived from the first battery.

The charging mechanism includes an upconverter that converts the first voltage to the third voltage which is large enough to charge the second battery. A controller monitors the second voltage of the second battery and controls the flow of current between the first battery and the second battery, such that the controller causes current to flow from the first battery to the second battery to charge the second battery when the second battery voltage is below a first level and stops the flow of current between the first battery and the second battery when the second battery has been fully charged.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION OF THE INVENTION

A power generation apparatus and method is described. In the following description, numerous specific details are set forth such as specific voltages, battery types, etc., in order to provide a thorough understanding of the present invention. It will be apparent, however, to one skilled in the art that the present invention may be practiced without these specific details. In other instances, well-known operations and functions have not been described in detail to avoid obscuring the present invention.

The present invention provides a dual battery system designed to operate from a low voltage primary battery and a secondary rechargeable battery. The voltage from the low voltage battery (e.g., the primary battery) is up-converted with a DC/DC converter and used to charge the higher voltage battery (e.g., the secondary battery) in the combination. The secondary battery is then used to discharge at a higher current and voltage that would be achievable from the low voltage primary battery.

In one embodiment, the primary battery comprises a 1.5 volt alkaline AA battery or a AAA battery, while the secondary battery is a rechargeable battery such as a series combination of three ⅓ AA nickel cadmium (NiCd) batteries producing 3.6 volts. The volume of the three NiCd batteries combined is roughly equivalent to the volume of one alkaline AA battery. In other embodiments, the secondary battery may be a lithium-ion battery, lead acid battery or other batteries that have a low internal resistance and are rechargeable. In other embodiments, both the primary battery and the secondary battery may comprise other battery types.

In one embodiment, the secondary rechargeable battery is used to discharge into a communications transmitter at a higher current and voltage than the alkaline AA or AAA batteries could achieve. After that transmission or multiple transmissions, the rechargeable secondary battery is recharged again from the primary battery.

AN EMBODIMENT OF THE PRESENT INVENTION

Figure 1:
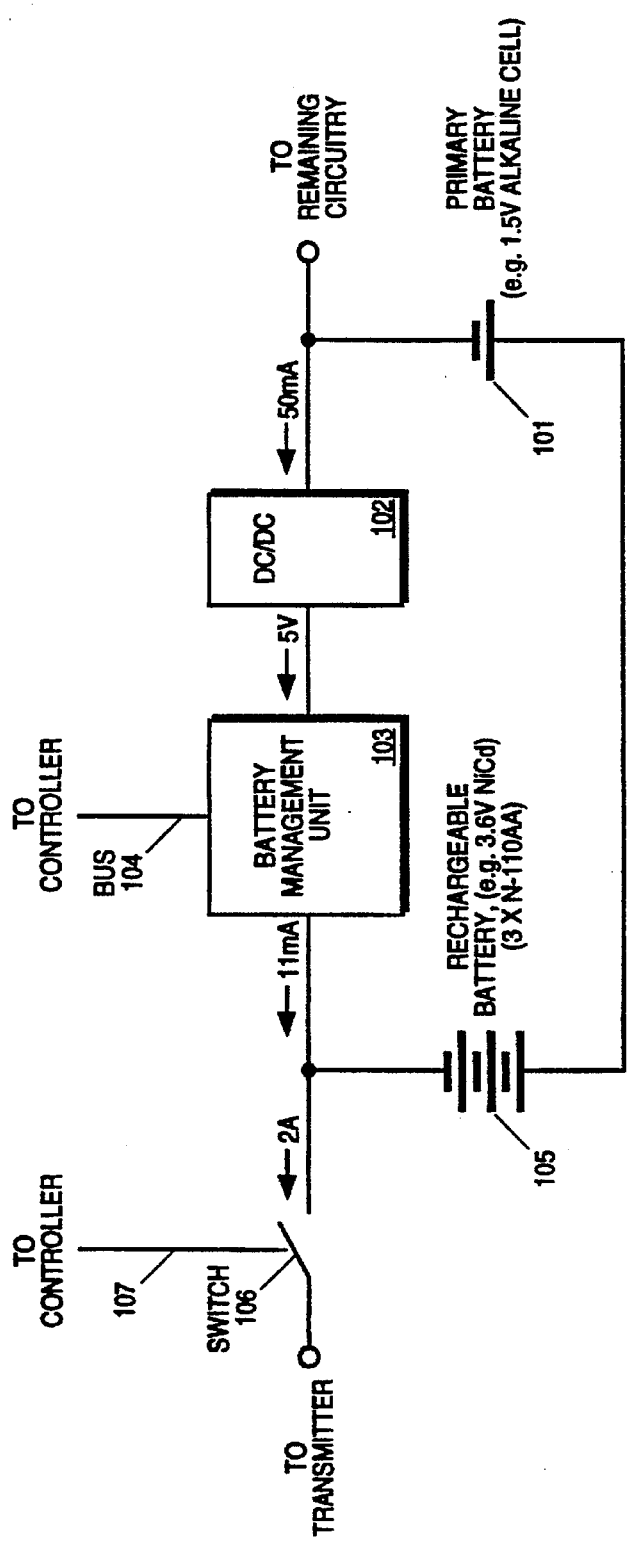
FIG. 1 is a circuit schematic for a battery power generation mechanism of the present invention.

FIG. 1 illustrates the power generation technique of the present invention. Referring to FIG. 1, a primary battery 101 is shown coupled to provide power to analog and/or digital circuitry (not shown). This circuitry may be located in a portable communications device. In another embodiment, primary battery 101 does not provide power to a portion of the circuitry of the unit. The primary battery 101 is also coupled to the input of a DC/DC converter 102. The output of the DC/DC converter 102 is coupled to one input of a battery management unit (BMU) 103. The BMU 103 is also coupled to a controller for the device via bus 104.

An output of BMU 103 is coupled to the output of secondary battery 105. The output of secondary battery 105 is also coupled to one input of switch 106. Switch 106 is also coupled to another portion of the circuitry of the device. Switch 106 is controlled via controller signal 107. Also note that one terminal of each of the secondary battery 105 and primary battery 101 are coupled to ground.

In one embodiment, primary battery 101 comprises a 1.5 volt AA alkaline cell, and the secondary battery 105 comprises 3N-110AA NiCd batteries coupled in series. The primary battery 101 represents the main replaceable battery in the system, and may be replaced in a manner well-known in the art (e.g., by exchanging cells). The secondary battery 105 may be replaceable. In one embodiment, the secondary battery 105 is not as accessible as the primary battery 101. For instance, removal of the secondary battery 105 may require removing screws to gain access to the battery's location.

The DC/DC converter 102 is powered by primary battery 101 and converts the voltage produced by the primary battery 101 to a higher voltage necessary to charge the secondary battery 105. In one embodiment, where the primary battery 101 is a 1.5 volt AA alkaline cell, the DC/DC converter 102 receives 1.5 volts at 50 milliamps of current and produces a 5 volt voltage which is received by the BMU 103. BMU 103 controls the flow of current from the primary battery 101 to the secondary (rechargeable) battery 105 and outputs the 5 volt voltage at 11 milliamps to the secondary battery 105. When the primary battery 101 is charging the secondary battery 105, BMU 103 allows current to flow from the primary battery 101 to the secondary battery 105. The flow of current may be controlled using a switch (e.g., a transistor) in BMU 103 that is turned on and off.

The BMU 103 also monitors the voltage of the secondary battery 105 to ensure that it charges correctly. That is, the BMU 103 monitors the voltage and determines when it has reached its peak charging and shuts off the current to the secondary battery 105 from the primary battery 101. In one embodiment, BMU 103 monitors the slope of the voltage curve in a manner well-known in the art and when the slope has attained a certain point (based on the battery type), BMU 103 determines that the battery has reached its peak charging and stops charging the battery. In one embodiment, BMU 103 monitors voltage of the secondary battery 105 using a resistor (e.g., a transistor) in a manner well-known in the art.

BMU 103 operates in conjunction with an external controller located in the device being powered. The external controller is used to control the BMU 104 and indicate when it is to operate. A bus 104 between the external controller and the BMU 103 allows for communication of specific information between the two. In one embodiment, bus 104 is bi-directional. Bus 104 may be used by BMU 103 to indicate to the external controller that it is charging the secondary battery 105. In another embodiment, bus 104 may be used to indicate to the external controller that the secondary battery 104 requires charging. Bus 104 may also be used by the external controller to indicate to BMU 103 that transmission is to occur and to cause charging to stop to allow for such transmission. The bus 104 may be used to indicate that the secondary battery 105 is fully charged.

Switch 106 in the system is used to disable the secondary battery 105 from the circuitry to which it is providing power when the secondary battery 105 is being charged. This is accomplished by opening the switch 106. In one embodiment, switch 106 comprises a transistor, such as a metal-oxide semiconductor field-effect transistor (MOSFET). In one embodiment, switch 106 is controlled by the external controller in the system. For instance, when disabling the power from the secondary battery to the circuitry, the gate of the transistor may receive a voltage causing the transistor to turn off.

In one embodiment, the secondary battery 105 is used to power the transmitter in a transceiver. The transmitter is operated according to a duty cycle having an "on" period of time followed by an "off" period of time and continually repeating the on and off periods where the sending of data requires multiple transmission periods. In one embodiment, the duration of the time periods is variable, with the worst case duty cycle having a 1.2 second "on" period followed by a 0.6 second "off" period (and continually repeating the on/off periods). During the 1.2 second "on" period, a data packet transfer is performed. During this transmission period, the external controller turns on switch 106 and indicates to the BMU 103 to stop charging the battery. In response, the BMU 103 disables current flow to the secondary battery 105 from the primary battery 101.

The BMU 103 still monitors the secondary battery 105 during transmission to determine its voltage level. When the voltage level has dropped to a predetermined low level (and the transmitter is off during its duty cycle), the BMU 103 allows the current to flow between the two batteries to charge the secondary battery 105.

In one embodiment, the voltage from the primary battery 101 is converted by the DC/DC converter 102 to 5 volts. The voltage is converted to 5 volts because the voltage used to charge the secondary battery 105 must be greater than the voltage produced by the secondary battery 105. Where the secondary battery is a 3.6 volt battery, the up-converted 5 volt voltage is able to charge the secondary battery 105. Note that the primary battery 101 may be also powering the remaining circuitry, or some portion thereof, in the transceiver.

The BMU 103 allows the current to flow to charge the secondary battery 105. When the secondary battery has been fully charged, the BMU 103 shuts down the current from the primary battery 101 to the secondary battery 105. When transmission is then to occur, the external controller switches the rechargeable secondary battery 105 to discharge into the transmitter to provide the bursts of high voltage and high current power necessary for the transmission. In one embodiment, where the 1.5 volt/50 milliamp current power for the primary battery 101 is upconverted to charge the 3.6 volt NiCd series combination of three N-110AA battery cells, the secondary battery 105 generates power with a 2 amp current at 3.6 volts.

One advantage of the present invention is that a rechargeable battery with a much lower series resistance than a primary battery can be used to power the transmitter. Thus, not only is the available voltage much higher in the dual battery system (over a single battery system), the available current is also much higher as well. The discharge pulse time of the system is limited only by the capacity of the rechargeable battery, thereby allowing long transmission times not achievable with capacitive discharge schemes. Note also that the size is reduced significantly over using a single primary battery system. In an embodiment described above, six AA alkaline cells would be required to generate the power equivalent to that generated by a volume equivalent of 2 AA cells.

Applications include wireless communications transceiver where the duration of the transmit time will be short and the size of the portable unit is required to be small, such as in two-way paging and packet radio systems. The present invention is, however, not limited to communications and can be used whenever the power required for the application exceeds that available from a small commonly available battery.

THE DIGITAL COMMUNICATIONS SYSTEM

Figure 2:
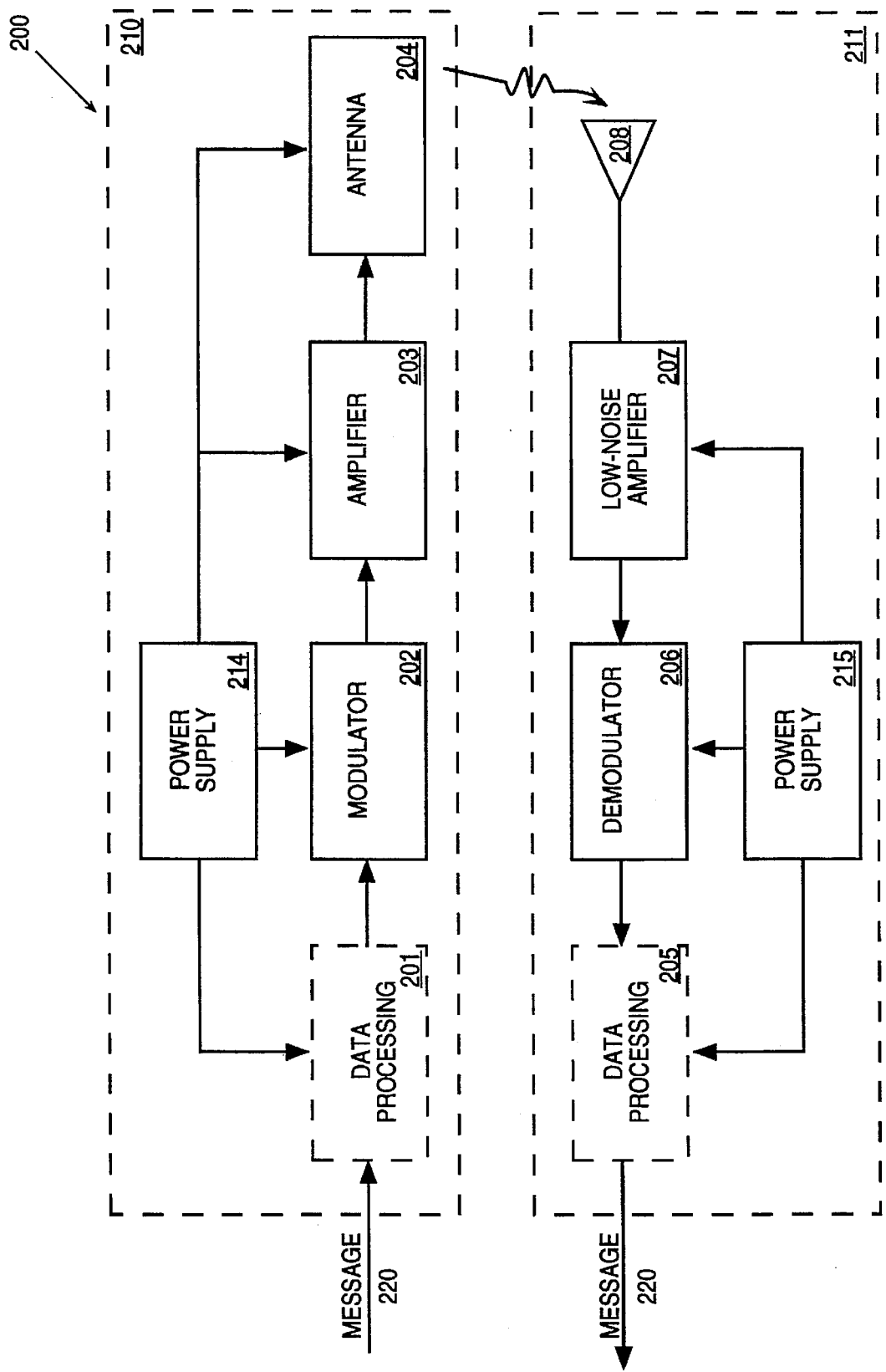
FIG. 2 illustrates a block diagram of an exemplary communication system according to the present invention.

FIG. 2 illustrates a block diagram of an exemplary digital communications system. The present invention is advantageously employed in wireless data communication systems. However, the present invention may be employed in other data communications systems.

Referring to FIG. 2, digital communications system 200 comprises transmitter 210 and receiver 211. Transmitter 210 includes data processing block 201 (optional), modulator 202, amplifier 203, antenna 204, and power supply 214, (such as shown in FIG. 1). Power supply 214 provides power to components of transmitter 210. Data processing block 201 is coupled to receive a message 220. The output of data processing block 201 is coupled to the input of modulator 202. The output of modulator 202 is coupled to input of amplifier 203. The output of amplifier 203 is coupled to transmitting antenna 204. The output from transmitting antenna 204 is radiated into the transmission medium and subsequently received by receiver antenna 208 of receiver 211. The output of receiver antenna 208 is coupled to the input of low-noise amplifier 207. The output of low-noise amplifier 207 is coupled to the input of demodulator 206. The output of demodulator 206 is coupled to the input of data processing block 205 (optional). The output of data processing block 205 is message 220. Power supply 215, such as shown in FIG. 1, provides power to components in receiver 211. Note that controller logic coordinating the operations of the components has not been shown to avoid obscuring the present invention.

Transmitter 210 transmits the signals throughout the digital communications system. Message signal 220 is initially received at the input of transmitter 210 and filtered to eliminate undesired components. Then, assuming message signal 220 is suitable for transmission, data processing block 201 samples message signal 220 and performs any necessary analog-to-digital conversion. Data processing block 201 may perform encoding, and any peripheral functions, such as output, displays, storage, etc. The output of data processing block 201 is a group of binary symbols. These binary symbols may undergo source coding.

The digitized output symbols from data processing block 201 are then modulated onto a carrier. In modulator 202, a parameter of the carrier, such as amplitude, frequency or phase, is modulated by the digital symbols. The modulation scheme of the present invention may be one of the many well-known modulation techniques, such as frequency shift keying, phase shift keying, amplitude shift keying (or on-off keying), and their many variations.

The modulated signal output from modulator 202 is amplified by amplifier 203 and input to the channel, wherein the modulated signals are transferred to their destination. In FIG. 2, the channel includes transmitting antenna 204, the space between transmitter 210 and receiver 211, and receiving antenna 208. The channel may include airwaves, cables, optical fiber, or other means for transferring the signals between transmitter 210 and receiver 211.

Once a signal is received by receiving antenna 208 in receiver 211, the signal is amplified by low-noise amplifier 207, demodulated by demodulator 206, and then processed by data processing block 205 (if required) to reproduce message 220, where data processing block performs any desired output, display, or storage functions as well as any desired decoding.

In one embodiment, data processing 201 (and data processing 205) of the digital communications system controls sampling of the data stream.

Although digital communication system 200 is shown with only a small set of components, other components may be included in the system. For instance, coders and decoders may be employed in transmitter 210 and receiver 211 respectively. Also, even though transmitter 210 and receiver 211 are shown as individual components, each may be part of a transceiver capable of performing both the transmit and receive functions.

In the described embodiment, amplifier 203 as part of the transmitter 210 receives power generated by one battery (e.g., battery 105 in FIG. 1) while the remainder of the transmitter 210 is powered by another battery (e.g., battery 101 in FIG. 1). In the present invention, the power supplied to amplifier 203 is higher than that generated by the other battery that powers the remainder of transmitter 210. In one embodiment, power supply 215 functions in the same manner with respect to the receiver and amplifier 207 as power supply 214.

Whereas many alterations and modifications of the present invention will no doubt become apparent to a person of ordinary skill in the art after having read the foregoing description, it is to be understood that the particular embodiment shown and described by way of illustration are in no way to be considered limiting. Therefore, reference to the details of the described embodiments are not intended to limit the scope of the claims which themselves recite only those features regarded as essential to the invention.

Thus, an apparatus and method for power generation has been disclosed.

I claim:

1. An apparatus for generating power for use in an electronic device, said apparatus comprising:

a first power source to supply power at a first wattage;

a first battery to supply power at a second wattage, wherein the second wattage is greater than the first wattage; and a charging mechanism coupled to the first power source and the first battery to charge the first battery using a voltage derived from the first power source.

2. The apparatus defined in claim 1 when the first power source comprises a second battery.

3. The apparatus defined in claim 1 wherein the charging mechanism comprises a converter that converts the voltage of the first power source to a voltage large enough to charge the first battery.

4. The apparatus defined in claim 3 wherein the first power source supplies power to the converter.

5. The apparatus defined in claim 2 wherein the charging mechanism comprises a controller that monitors voltage of the first battery and controls flow of current between the first battery and the first battery, wherein the controller causes current to flow from the second battery to the second battery to charge the second battery.

6. The apparatus defined in claim 5 wherein the controller stops the flow of current between the first battery and the second battery when the first battery has been charged to a predetermined level.

7. The apparatus defined in claim 2 wherein volume of the first battery is substantially equivalent to volume of the second battery.

8. The apparatus defined in claim 1 wherein the first battery powers a transmitter in the electronic device.

9. The apparatus defined in claim 8 further comprising a controller that switches the first battery to discharge into the transmitter in the electronic device when transmitting data and prevents the first battery from discharging into the transmitter when the first battery is recharging.

10. An apparatus for generating power for use in a electronic device, said apparatus comprising:

a first battery to supply power at a first voltage and a first current;

a second battery to supply power at a second voltage and second current, wherein the second current and power from the second battery are greater than the first current and power from the first battery respectively; and a charging mechanism coupled to the first battery and the second battery, wherein the charging mechanism comprises an upconverter to convert the first voltage to a third voltage large enough to charge the second battery and a controller that monitors the second voltage of the second battery and controls flow of current between the first battery and the second battery, wherein the controller causes current to flow from the first battery to the second battery to charge the second battery when the second battery voltage is below a first level and stops the flow of current between the first battery and the second battery when the second battery has been charged to a predetermined level.

11. The apparatus defined in claim 10 wherein the first battery supplies power to the upconverter.

12. The apparatus defined in claim 10 wherein volume of the second battery is substantially equivalent to volume of the first battery.

13. The apparatus defined in claim 10 wherein the second battery powers a transmitter in the electronic device.

14. The apparatus defined in claim 13 further comprising a control mechanism to switch the second battery such that the second battery discharges power into the transmitter portion of the unit when transmitting data and prevents the second battery from discharging into the transmitter portion when the second battery is recharging.

15. A communication unit comprising:

a transmitter;

a switch coupled to the transmitter;

processing circuitry coupled to the transmitter to provide signals to the transmitter for transmission;

a first battery to supply power at a first current to the processing circuitry of the communications unit;

a converter coupled to the first battery to convert voltage from a first level to a charging voltage, wherein the charging voltage is greater than the first level;

a second battery to supply power to the transmitter;

a battery controller unit coupled to the converter and the second battery to monitor the second battery voltage of the second battery and to control flow of current between the first battery and the second battery, wherein the battery controller unit causes current to flow from the first battery to the second battery to charge the second battery when voltage of the second battery is below a predetermined level.

16. The communication unit defined in claim 15 further comprising a switch coupled between the transmitter and the second battery, wherein the switch is opened during charging of the second battery and closed when the transmitter is transmitting.

17. The communication unit defined in claim 16 wherein the switch comprises a field-effect transistor (FET).

18. The communication unit defined in claim 15 wherein the transmitter comprises a modulator and at least one amplifier.

19. An electronic device comprising;

a first portion of device components;

a second portion of device components coupled to the first portion of device components;

a first battery structure coupled to supply power to the first portion of device components; and a second battery structure coupled to supply power to the second portion of device components, wherein power supplied by the second battery structure is greater than power supplied by the first battery structure, and further wherein volume of the second battery structure is substantially equivalent to volume of the first battery structure.

20. The electronic device defined in claim 19 further comprising a charging mechanism coupled to the first battery structure and the second battery structure to charge the second battery structure using the first battery structure.

21. A pager comprising:

a battery power generator comprising a primary battery to generate power at a first voltage, a secondary battery operable to discharge power at a second voltage higher than the first voltage and at a current higher than that of the primary battery, and upconverter to convert the first voltage from the primary battery into a charging voltage greater than the second voltage to recharge the secondary battery;

a receiver to receive paging messages, wherein the receiver is coupled to the battery power generator; and a transmitter to transmit paging messages, wherein the transmitter is coupled to the battery power generator and comprises a modulator, an amplifier coupled to the secondary battery and the modulator to amplify modulated paging messages from the modulator for transmission, and an antenna coupled to the amplifier.

22. The pager defined in claim 21 wherein the modulator and antenna are powered by the primary battery, and the amplifier is powered by the secondary battery.

23. The pager defined in claim 21 further comprising a battery management unit coupled to control current flow between the primary and secondary batteries, wherein the battery management unit allows current to flow between the primary and secondary batteries when the primary battery is charging the secondary battery and stops current flow between the primary and secondary batteries after charging of the secondary battery has been completed.

24. The pager defined in claim 23 further comprising a bus coupled to the battery management unit to communicate charge status of the secondary battery to an external location.

25. The pager defined in claim 21 further comprising a switch coupled between the secondary battery and the transmitter to disconnect the secondary battery from the transmitter when recharging the secondary battery.

26. The pager defined in claim 21 wherein the secondary battery has a lower series resistance than the primary battery.

27. The communication unit defined in claim 15 wherein the second battery is operable to discharge power with higher current and voltage than the first battery.

28. The communication unit defined in claim 15 wherein the transmitter comprises:

a modulator;

an amplifier coupled to the second battery and the modulator to amplify modulated paging messages from the modulator for transmission; and an antenna coupled to the amplifier.

* * * * *